J. H. NESBITT.
AUTOMOBILE CRADLE.
APPLICATION FILED DEC. 26, 1916.
1,232,070.
Patented July 3, 1917.
2 SHEETS—SHEET 2.
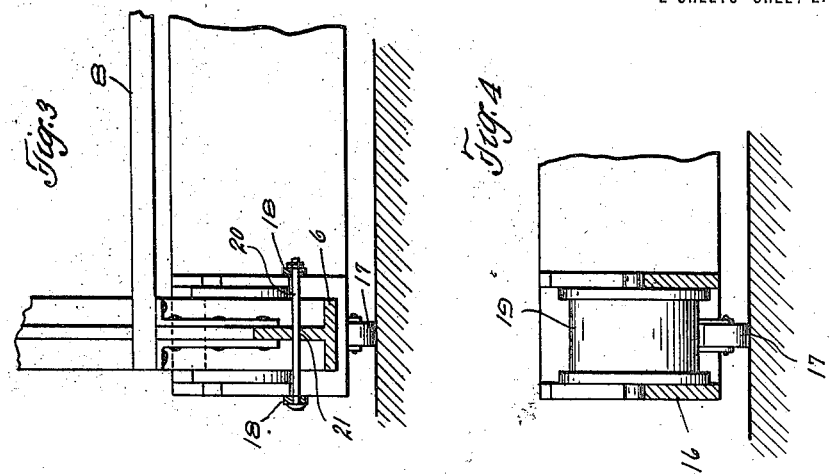
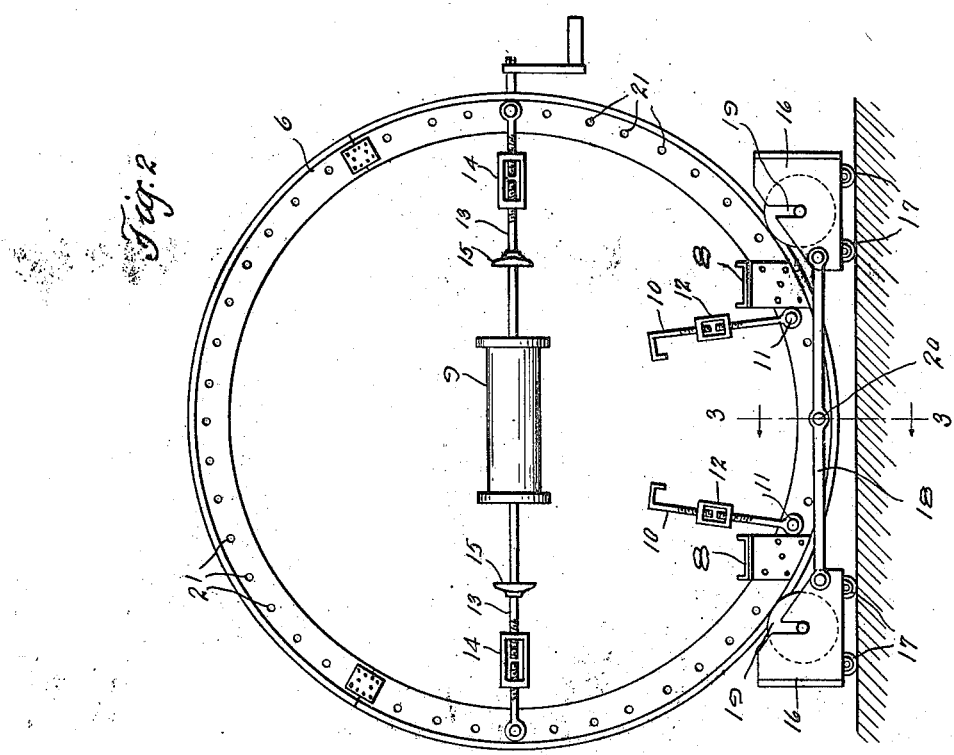
Inventor
J. H. NESBITT
By John A. Bomhardt
Attorney

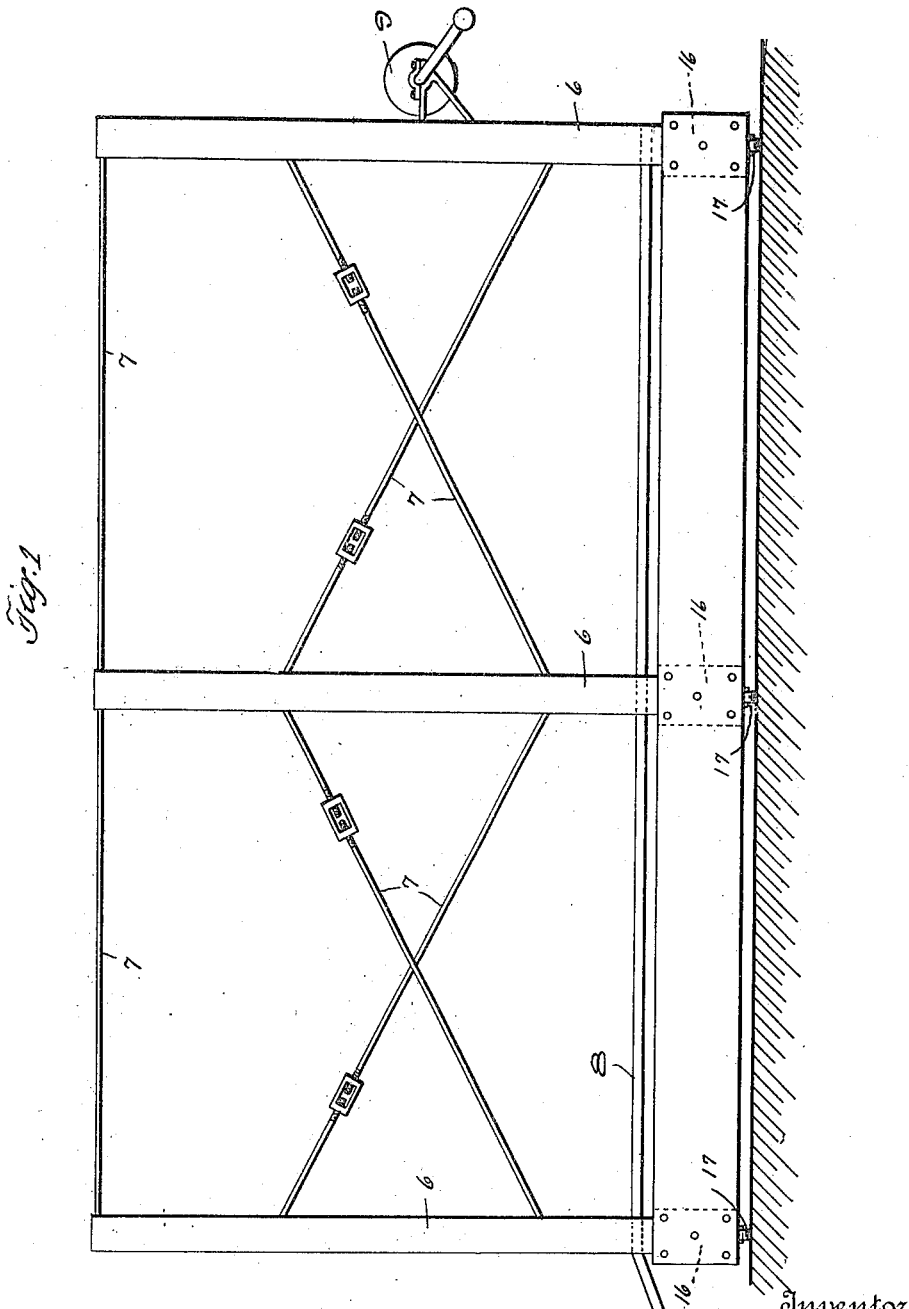

UNITED STATES PATENT OFFICE.

JAMES HENRY NESBITT, OF CLEVELAND, OHIO.

AUTOMOBILE-CRADLE.

1,232,070.  Specification of Letters Patent.  Patented July 3, 1917.

Application filed December 26, 1916. Serial No. 139,055.

*To all whom it may concern:*

Be it known that I, JAMES H. NESBITT, a citizen of the United States, residing at Cleveland, in the county of Cuyahoga and State of Ohio, have invented certain new and useful Improvements in Automobile-Cradles, of which the following is a specification.

This invention relates to automobile cradles or holders, adapted to be used for the purpose of rotating an automobile to any desired position for repairing or adjusting the same, so as to avoid the necessity of crawling under the same, which is dangerous and inconvenient.

The apparatus comprises a skeleton barrel or cylinder, provided with tracks to receive the automobile, and with clamps to hold the same in position therein, and the cylinder is mounted on rollers so that it can be turned to any desired extent, to expose the under parts of the automobile in a convenient position for work thereon.

In the accompanying drawings Figure 1 is a side elevation of the device. Fig. 2 is an end elevation. Fig. 3 is a section on the line 3—3 of Fig. 2. Fig. 4 is a detail in section showing one of the supporting rollers.

The frame of the cradle consists of a number of rings of T iron indicated at 6, connected by braces 7. Three of these rings are shown and will ordinarily be sufficient, one ring being located at each end and one at the middle, thus producing a skeleton cylinder or tubular cradle, of sufficient size to receive an automobile therein. The rings support a pair of channel iron rails 8, extending lengthwise in the cradle and adapted to receive the wheels of the motor vehicle thereon. A windlass 9 is supported at one end of the cradle, and may be used to pull the machine along the tracks 8, into the cradle.

To hold the machine in position in the cradle clamps are provided to engage the axles and the body of the automobile. Those for the axles consist of hooked rods 10 pivoted at 11 to the end rings, these rods being made in sections connected by turn-buckles 12, whereby after the hooks are engaged with the axles the rods can be tightened. The side clamps may consist of rods 13, adjustable by turn-buckles 14, and having heads 15 adapted to be pressed against the sides of the vehicle body. These heads 15 are preferably padded to avoid marring the car.

The cradle thus constructed is rotatably mounted on a truck consisting of two side frames 16 mounted on rollers 17 so that the whole apparatus can be moved about from place to place. The side frames 16 are connected together by bars 18 at the ends, and mounted in these frames are rollers 19, in position to receive and support the ring frames 6, which rest thereon. The cradle being thus supported on the rollers 19 can be turned to any desired position, for most convenient operation on the automobile held therein, and to hold the cradle in the desired position I provide a locking bolt 20 inserted through holes in the cross rods 18, and through any one of a series of holes 21 in the inner flange of the T frame 6.

The manner of use of the device will be obvious from the foregoing description, and it will be appreciated that various changes may be made in the details of the structure, within the scope of the invention. The use of the apparatus will eliminate much of the danger and difficulty of obtaining access to the under parts of an automobile for the purpose of repairing or the like.

What I claim as new is:

1. A cradle for automobiles or the like, comprising a hollow skeleton structure adapted to receive an automobile therein, and provided with clamps to hold the automobile in place, said structure being rotatably mounted, whereby it may be turned to desired positions and the clamps being adjustable to various positions on the inside of the structure to hold automobiles of various types.

2. A cradle for automobiles or the like, comprising a hollow rotary structure having tracks therein to receive the automobile wheels, and clamps pivoted to the said structure at the inside thereof to hold the automobile in place therein.

3. A cradle for automobiles or the like, comprising a hollow rotary skeleton structure having tracks therein for the automobile wheels, clamps engageable with the axles of the automobile, and side supports engageable with the body thereof.

JAMES HENRY NESBITT.

Witnesses:
WILLIAM J. KEENEN,
JOHN J. ENGLEHART.